United States Patent Office 2,854,371
Patented Sept. 30, 1958

2,854,371
METHOD AND SOLUTION FOR TREATMENT OF MAGNESIUM ARTICLES

Signe Schjelderup, Littleton, Colo., assignor to Shwayder Bros., Inc., Denver, Colo., a corporation of Delaware No Drawing. Application February 1, 1956
Serial No. 562,635

15 Claims. (Cl. 148—6.21)

This invention relates to the treatment of articles made of magnesium or alloys thereof, and more particularly to a method of and solution for the treatment of such magnesium articles prior to the application of a liquid surface coating, such as paint, enamel, lacquer, adhesive or the like.

Among the objects of this invention are to provide a novel solution for the treatment of magnesium articles; to provide such a solution which does not require the use of an electrolytic process; to provide such a solution which may be used simply and effectively to produce a comparatively greater adhesion or tenacity of a surface coating film; to provide such a solution and a method in which such a solution may be utilized, which does not require undue amounts of expensive reagents; to provide such a solution and method which may be used with conventional equipment; to provide such a solution and method which will produce satisfactory results from a reasonably broad range of constituents and therefore is not subject to sharp fluctuations in operation; to provide such a solution which can be used for a considerable period of time without regeneration or replenishment, but which may be easily and relatively simply regenerated or replenished when occasion demands; to provide such a solution which does not tend to deteriorate rapidly; and to provide such a solution and method which will be economical in use and produce satisfactory results.

Additional objects and the novel features of this invention will become apparent from the description which follows.

A solution of the present invention includes the constituents for each gallon of water, as set forth in the following Table 1 and Table 2 and a preferred solution in Table 3 and Table 4.

Table 1

| | |
|---|---|
| $CrO_3$ | 20 g. to 170 g. |
| Slightly soluble sulfate | Excess of solubility. |
| Slightly soluble nitrate | Excess of solubility. |
| $H_2O$ | 1 gal. |
| Acid to make pH | 0.9 to 2.5 |

Table 2

| | |
|---|---|
| $CrO_3$ | 20 g. to 170 g. |
| c.$H_2SO_4$ | 1 ml. to 22.5 ml. |
| Slightly soluble nitrate | Excess of solubility. |
| $H_2O$ | 1 gal. |
| pH | 0.9 to 2.5 |

Table 3

| | | |
|---|---|---|
| Chromic acid | g | 20 |
| $Ba(NO_3)_2$ | g | 1.86 |
| $CaSO_4$ | g | 38 |
| c.$H_2SO_4$ | ml | 3 |
| $H_2O$ | gal | 1 |
| pH | | 1.42 |

Table 4

| | | |
|---|---|---|
| Chromic acid | g | 20 |
| $CaSO_4$ | g | 38 |
| c.$H_2SO_4$ | ml | 3 |
| $BaCO_3$ | g | 1.42 |
| c.$HNO_3$ | ml | 0.9 |
| $H_2O$ | gal | 1 |
| pH | | 1.42 |

While chromic acid is the preferred chromate ion reagent, based upon equivalent molecular proportions, other $CrO_3$ compounds may be used instead of chromic acid, such as $K_2Cr_2O_7$ or $Na_2Cr_2O_7$. Also, while barium nitrate is the preferred nitrate, it would appear possible to use other nitrates, although such other nitrate should be only slightly soluble in acid solution, as is barium nitrate. Conveniently, the barium nitrate is produced by adding $BaCO_3$ and $HNO_3$, as in Table 4, to produce barium nitrate in accordance with the following reaction:

$$2HNO_3 + BaCO_3 \rightarrow Ba(NO_3)_2 + H_2O + CO_2$$

The sulfate is used in excess of solubility to provide a supply of sulfate ions, as the sulfuric acid is used up and, while not necessary for operability, does increase the life of the solution before regeneration or addition is necessary. Calcium sulfate is the prefererd sulfate, being only slightly soluble in acid solution, but other sulfates which are also only slightly soluble in acid solution, except magnesium sulfate, could be used. Also, the amount of $CaSO_4$ used may be in excess of that shown in Tables 3 and 4, since the amount preferred provides a slight excess of calcium sulfate and a greater excess of calcium sulfate may be used, since the excess apparently does not go into solution but remains available as that present in the solution is used up.

While the pH of a solution of this invention may vary from 0.9 to 2.5, the pH may also be adjusted in accordance with the surface coating to be used, as will be described later. Thus, the solution of Table 3 and Table 4 has been used until the pH reached about 2.0, when sufficient $H_2SO_4$ was added to bring the pH back to 1.42 and chromic acid was added to reproduce the original concentration, while barium nitrate or compounds which produce nitrate were added to maintain the concentration thereof in excess of solubility. While sulfuric acid is preferred, other acids could be used which are sufficiently strong to produce the desired pH. Thus, HCl may be substituted for $H_2SO_4$, although the solution then may have a slightly less useful life. However, phosphoric acid appears to be undesirable, since use of the same produced a powdery surface on the magnesium article, thus markedly reducing the tenacity of the surface coating later applied. Also, organic acids, such as formic and acetic acids, do not appear to reduce the pH sufficiently, while nitric acid, particularly when it is placed in the solution to produce barium nitrate, may produce an excess of nitrate ion which may tend to retard the reaction time. Of course, some HCl, $HNO_3$ or other acid could be substituted for a portion of the $H_2SO_4$ without undue detrimental effect.

Another solution having a lower pH initially, which has been used with success, but required pH adjustment before initial use, had the constituents and amounts thereof shown in Table 5:

Table 5

| | |
|---|---|
| Chromic acid | 114 g. |
| $CaSO_4$ | 38 g. |
| c.$H_2SO_4$ | 22.5 ml. |
| $BaCO_3$ | 1.42 g. |
| c.$HNO_3$ | 0.9 ml. |
| $H_2O$ | 1 gal. |
| pH | 0.7 (adjusted to 0.9). |

When the above solution was originally made up, it had a pH of about 0.7, but was adjusted to pH 0.90. Thus, after the above solution was originally made up, a magnesium sheet, which may be commercial magnesium but was actually scrap of the same material to be treated, was immersed in the solution for about 30 minutes. An amount of magnesium sheet or scrap amounting to about 1.625 square feet per gallon of solution was used. After the initial treatment, the solution had a pH of about 0.90 and was then ready for use. The solution may be used until the pH becomes 2.1 or perhaps even 2.1 or 2.5, depending upon the type of surface treatment and the time which may be taken in the dip, as described later.

The magnesium articles to which a surface coating is to be applied may be dipped in the solution for a period of time of from ½ minute or less to 5 or 10 minutes, depending upon the pH of the solution and the type of color compatible with the liquid surface coating to be applied. For the highest pH and the shorter periods of time, an iridescent color is produced on the surface of the magnesium articles, while for a slightly longer period of time or a slightly lower pH, a gold color is produced on the surface of the magnesium articles. With a successively lower pH or a successively longer period of treatment, brown and then a black color tends to be produced. It appears that the tenacity of the surface coating is slightly greater when the color is between brown and black, although the tenacity of the surface coating when an iridescent or gold color is produced has been found to be equal to, or greater than, the tenacity of a surface coating applied to a magnesium article after treatment by prior solutions or processes, such as by the use of a solution containing about 0.75 lb. per gallon of $Na_2Cr_2O_7$ and 0.75 pint per gallon of concentrated $HNO_3$ at 17 N. With this latter solution, it is necessary to adjust the pH when the concentration of $HNO_3$ falls below 0.25 pint per gallon, on the basis of concentrated $HNO_3$, and to add additional sodium chromate to raise to the original concentration. However, after about seven adjustments of this kind, this previous solution must be discarded. With the solution of the present invention, the pH may be permitted to rise to 2.5 in the event that an iridescent or gold color is being produced, but may be as low as 1.5 if a brown or black color is being produced. As will be evident, when a dark colored or non-transparent surface coating is to be applied, the color of the surface of the magnesium article does not show through the same so that a brown or black color of the article surface is unobjectionable. However, when a light colored or transparent surface coating is to be applied, then the color of the surface of the magnesium articles should be iridescent or gold, so as to prevent an objectionable background showing through the surface coating. The solution of this invention apparently produces a complex magnesium chromate on the surface of the magnesium article and it is believed that this complex chromate on the surface provides a solid bond with the liquid surface coating applied later. In addition, the treatment appears to produce an etching, which may be microscopic, thus causing the surface to be roughened and increases the tenacity of the bond with the surface coating.

In the method of this invention, the articles to be treated are conveniently passed through a bath of the solution, as by a continuous conveyor, so that the immersion time will be sufficient to produce the desired surface treatment, depending, of course, upon whether a brown or black color can be used, or whether a lighter color, such as gold or iridescent, is necessary. In the event that a brown to black color of the surface can be produced, the speed of the conveyor can be set so that the desired color is produced, and as the color tends to become a lighter brown, the conveyor may be slowed to maintain the coloration and when an immersion time, such as about 5 minutes instead of perhaps about 1 minute, is reached, the solution may be tested for pH. If the pH has risen to about 2.1, for instance, sufficient $H_2SO_4$ may be added so that the pH returns to 1.4, while it is also desirable to analyze the solution for $CrO_3$ content and add sufficient $CrO_3$ or equivalent to bring the solution back to the original $CrO_3$ content of approximately 20 g. per gallon. Or, the solution may be tested periodically, depending upon the number of articles being treated and particularly the surface area thereof. The bath through which the magnesium articles are moved may be sufficiently large that a considerable number may be treated before any adjustment is necessary, such as about 1500 gallons. With a fairly large bath, wherein the concentration tends to change slowly, the bath need be tested only every two to three days or perhaps once a week.

After removal from the solution, the articles are preferably rinsed in running water, or by water sprays, and then air dried, as in the open air, although oven or hot air drying is preferably utilized when the relative humidity is high. The articles are preferably dried merely to a point at which there is no visible moisture thereon, either as droplets or water film, after which the liquid surface coating, such as paint, enamel or the like, may be applied by dipping, spraying, brushing, or in any other convenient manner. In operations embodying the principles of this invention, an alkyd resin enamel has been applied with particular success to magnesium articles so treated, although other types of enamels, as well as other types of paints, lacquers, adhesives and other liquid surface coatings, may be applied to the articles. For instance, an epon resin lacquer, a melamine resin lacquer and a nitrocellulose lacquer have each been applied with highly satisfactory results, both as to adhesion and on salt spray test. However, a zinc chromate primer followed by dipping in a nitrocellulose lacquer showed considerable increase in resistance to a salt spray test but approximately the same adhesion as articles without pretreatment. A considerable increase in adhesion, in general, was found, compared with articles not pretreated, when magnesium articles were treated in the solution, over a pH range of 0.90 to 2.21 and dipping times varying from 1 minute to 10 minutes, after which a vinyl resin adhesive was applied. In commercial operations, using a bath containing 1500 gallons of the solution of this invention, the magnesium articles have been moved by a continuous conveyor through the bath initially made up in accordance with Table 4, which required replenishing about once every three days. Also, a 1500 gallon bath initially made up in accordance with Table 5 required replenishment approximately every two weeks and was finally discarded after 13 replenishments, thus indicating a useful life of about twice that of the best previous solution containing $Na_2Cr_2O_7$ and $HNO_3$ as described hereinbefore. The articles may be carried by a continuous conveyor, not only through the bath but also through running water for rinsing and then merely dried in the open air while remaining on the conveyor, which then carries the articles to a surface coating bath for applying the liquid surface coating, such as enamel. After removal from the enamel dip, the articles may be carried by the same conveyor through ovens in which the enamel is baked on.

The tenacity of the surface coating, as of enamel, may be tested by scraping, as with a sharp blade. Articles treated in accordance with the present invention, when scraped with a sharp blade, are provided with a surface coating having sufficient tenacity that the coating is removed only at the points at which the blade actually engages the surface, with no evidence of chipping or flaking off. Also, when the blade scrape test is applied, a deeper sound is produced by the scraping and there is a continuous resistance to the movement of the blade, rather than initial resistance followed by the blade sliding quite readily along, as with surface coating having less tenacity than produced by this invention. In salt spray tests, the surface coatings produced by this invention have been highly superior to articles which have been surface coated without special treatment and equal to the best previous treatment, i. e., the previously mentioned solution containing 0.75 lb. per gallon of $Na_2Cr_2O_7$ and 0.75 pint per gallon of concentrated $HNO_3$. In addition, this best previous solution tended to be critical in reaching a point at which the desired results were not secured. as compared therewith, by use of the solution of this invention, even when the pH rose to the permissible maximum, the tenacity of the surface coating later applied was not reduced sufficiently to be objectionable from a commercial standpoint.

From the foregoing, it will be evident that the solution and method of this invention fulfill to a marked degree the requirements and objects hereinbefore set forth. The solution is made up readily and the constituents are not so expensive but that the cost of treatment is relatively low. In use, the effective life of the solution is such that the desirability of lowering the pH and replenishing $CrO_3$ occurs infrequently, such as only every few days, although this generally depends upon the number and surface area of the articles being treated. However, the loss in tenacity of the final surface coating is so slight that a wide time range in replenishing the solution is permissible. Of course, the superior results obtained are such that a very slight loss in tenacity is insufficient to be detrimental from a commercial standpoint. The pH of the solution and the dipping time may also be readily correlated to produce the greatest tenacity of the ultimate surface coating, or to produce a slightly less amount of tenacity, but unobjectionable background color when a transparent surface coating is to be applied. The fact that the solution is highly effective at room temperatures and does not require electrolytic treatment, not only simplifies the operation, but also minimizes the cost thereof. Also, a continuous conveyor may be used to carry articles through the solution and then to subsequent application of the liquid surface coating, as by dipping, which renders the method of this invention highly effective and economical in use.

Although a particularly effective manner of dipping or immersing the articles in the solution, i. e., by a continuous conveyor, has been described, it will be understood that the articles may be treated with the solution in numerous other ways.

What is claimed is:

1. A solution for treating articles formed of magnesium and magnesium alloys, comprising water; a chromate ion reagent in the proportions of 20 grams to 170 grams $CrO_3$ per gallon of water; barium nitrate present in excess of solubility; and a strong acid in sufficient amount to cause the pH to be betwen 0.9 and 2.5.

2. A solution as defined in claim 1, wherein said acid is a mineral acid selected from the group consisting of hydrochloric acid and sulfuric acid in an amount proportional to from 1 ml. to 22.5 ml. of concentrated sulfuric acid per gallon of water.

3. A solution as defined in claim 1, wherein said barium nitrate is present in the amount of approximately 1.86 grams per gallon of water.

4. A solution as defined in claim 1, wherein said acid is sulfuric acid.

5. A solution for treating articles formed of magnesium and magnesium alloys, comprising water; a chromate ion reagent in the proportion of 20 grams to 170 grams $CrO_3$ per gallon of water; barium nitrate in excess of solubility; calcium sulfate in excess of solubility; and a strong acid in sufficient amount to cause the pH to be between 0.9 and 2.5.

6. A solution as defined in claim 5, wherein said acid is sulfuric acid and is present in an amount from 1 ml. to 22.5 ml. of conc. $H_2SO_4$ per gallon of water; said chromate ion reagent is chromic acid, and is present in the amount of approximately 20 grams per gallon of water; said barium nitrate is present in the amount of at least approximately 1.86 grams per gallon of water; and said calcium sulfate is present in the amount of at least approximately 38 grams per gallon of water.

7. A solution for treating articles formed of magnesium and magnesium alloys, as defined in claim 5, wherein said chromate ion reagent is chromic acid and is present in the amount of approximately 114 grams per gallon of water; said barium nitrate is present in the amount of at least approximately 1.86 grams per gallon of water; said calcium sulfate is present in the amount of at least approximately 38 grams per gallon of water; and said acid is sulfuric acid.

8. A solution as defined in claim 5, wherein said barium nitrate is the reaction product of approximately 1.42 grams of barium carbonate and approximately 0.9 ml. of concentrated nitric acid, each per gallon of solution.

9. A method of treating magnesium articles prior to applying a liquid surface coating thereto, which comprises immersing said articles in a solution as defined in claim 1.

10. A method as defined in claim 9, wherein said article is immersed in said solution for a period of between approximately one-half minute and ten minutes.

11. A method of treating a magnesium article prior to applying a liquid surface coating thereto, which comprises immersing said article in a solution as defined in claim 1; removing said article from said solution; rinsing said article with water; drying said article; and applying said surface coating liquid thereto.

12. A method of treating a plurality of magnesium articles prior to applying a liquid surface coating thereto, which comprises immersing said articles in a solution as defined in claim 1; and maintaining the solution pH between 0.9 and 2.1

13. A method as defined in claim 12, wherein said acid of said solution is sulfuric acid and said chromate ion reagent is chromic acid; and which includes adding sulfuric acid to maintain the pH and adding chromic acid to reproduce the initial chromate ion concentration.

14. A method of treating a plurality of magnesium articles prior to the application of a liquid surface coating thereto, comprising conveying said articles through a bath formed of a solution as defined in claim 6 at such a rate that the immersion time will be approximately one-half minute to ten minutes; when the pH of said solution reaches 2.1 adding sufficient sulfuric acid to reduce the pH to approximately 1.4 and adding sufficient chromic acid to reproduce the initial chromate ion concentration; after removal of said articles from said solution, rinsing with water; drying said articles; applying said liquid surface coating to said articles; and then drying said surface coating thereon.

15. A method of treating a plurality of magnesium articles prior to the application of a liquid surface coating thereto, comprising conveying said articles through a bath formed of a solution as defined in claim 7 at such a rate that the immersion time will be approximately one-half minute to ten minutes; maintaining the pH of said solution by periodically adding sulfuric acid and periodically adding chromic acid to reproduce the initial chromate ion concentration; after removal of said articles from said solution, rinsing with water; drying said articles; applying said liquid surface coating to said articles; and then drying said surface coating thereon.

References Cited in the file of this patent

UNITED STATES PATENTS

| | | |
|---|---|---|
| 1,480,869 | Thomas | Jan. 15. 1924 |
| 2,428,749 | De Long | Oct. 7, 1947 |